(12) United States Patent
Wang et al.

(10) Patent No.: US 11,495,150 B2
(45) Date of Patent: Nov. 8, 2022

(54) LI-FI COMMUNICATIONS FOR SELECTING CONTENT FOR DISTRIBUTION ACROSS A SEQUENCE OF DISPLAYS ALONG A VEHICLE PATHWAY

(71) Applicant: Telefonaktiebolaget LM Ericsson (publ), Stockholm (SE)

(72) Inventors: Keven Wang, Sollentuna (SE); Athanasios Karapantelakis, Solna (SE); Nicolas Seyvet, Kista (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 16/637,022

(22) PCT Filed: Sep. 6, 2017

(86) PCT No.: PCT/EP2017/072283
§ 371 (c)(1),
(2) Date: Feb. 6, 2020

(87) PCT Pub. No.: WO2019/048032
PCT Pub. Date: Mar. 14, 2019

(65) Prior Publication Data
US 2020/0202756 A1    Jun. 25, 2020

(51) Int. Cl.
*H04N 21/262* (2011.01)
*G09F 19/22* (2006.01)
(Continued)

(52) U.S. Cl.
CPC ............. *G09F 19/22* (2013.01); *G03B 25/00* (2013.01); *H04N 21/21815* (2013.01);
(Continued)

(58) Field of Classification Search
None
See application file for complete search history.

(56) References Cited

U.S. PATENT DOCUMENTS

2001/0022332 A1    9/2001   Harland
2010/0029268 A1*   2/2010   Myer ..................... H02J 7/35
                                                    340/521
(Continued)

FOREIGN PATENT DOCUMENTS

CN    101339721 B  *  6/2011  ............ G09F 15/02
CN    102184692 A  *  9/2011
(Continued)

OTHER PUBLICATIONS

International Search Report and Written Opinion of the International Searching Authority for PCT International Application No. PCT/EP2017/072283 dated Nov. 21, 2017.
(Continued)

*Primary Examiner* — William J Kim
(74) *Attorney, Agent, or Firm* — Sage Patent Group

(57) ABSTRACT

A content distribution node that distributes content to display devices which are arranged in a spaced apart sequence along a pathway of vehicles for display to passengers. The content distribution node receives from a mobile gateway node of a vehicle, through a Light Fidelity signal receiver circuit, a profile message containing profile information related to the vehicle. The content distribution node selects, from among content files available in a content repository, a set of video frames for distribution to the display devices based on the profile information. The content distribution node distributes different video frames among the set of video frames to different ones of the display devices with timing of the distribution that allows the video frames among the set to be displayed on respective ones of the
(Continued)

US 11,495,150 B2
Page 2 display devices in the sequence before arrival of the vehicle within a field-of-view of at least one of the display devices.

20 Claims, 10 Drawing Sheets

(51) Int. Cl.
*H04N 21/2668* (2011.01)
*H04N 21/218* (2011.01)
*G03B 25/00* (2006.01)

(52) U.S. Cl.
CPC ... *H04N 21/2668* (2013.01); *H04N 21/26258* (2013.01); *G09F 2019/221* (2013.01)

(56) References Cited

U.S. PATENT DOCUMENTS

2017/0289596 A1* 10/2017 Krasadakis ........... H04W 4/021
2018/0212935 A1* 7/2018 Iyer .................... H04L 63/0876

FOREIGN PATENT DOCUMENTS

| CN | 104299539 A | * | 1/2015 | ............ G09F 15/02 |
|---|---|---|---|---|
| CN | 210489199 U | * | 5/2020 | |
| CN | 111965633 A | * | 11/2020 | |
| EP | 1589520 A2 | | 10/2005 | |
| GB | 2317985 A | | 4/1998 | |
| GB | 2525016 A | | 10/2015 | |
| JP | 2002132197 A | * | 5/2002 | |
| JP | 2005003966 A | * | 1/2005 | |
| KR | 20020042048 A | | 6/2002 | |
| WO | 2003041038 A1 | | 5/2003 | |

OTHER PUBLICATIONS

Leba et al., "LiFi—The Path to a New Way of Communication," 12th Iberian Conference on Information Systems and technologies (CISTI), AISTI, Jun. 21, 2017, 6 pages.

Wikipedia, "Zoetrope," https://en wikipedia.org/w/index php?title=Zoetrope&oldid=799040181, last updated Sep. 5, 2017, 9 pages.

Lew, "Animation Advertisements Light Up in the Subway," Wired, https://www.wired.com/2008/05/animation-adver/, May 15, 2008, 4 pages.

Alderson, "What Happened to Subway Tunnel Advertisements?," AMP, https://www.ampagency.com/blog/what-happened-to-subway-tunnel-advertisements, downloaded from the Internet Sep. 6, 2017, 5 pages.

* cited by examiner

LI-FI COMMUNICATIONS FOR SELECTING CONTENT FOR DISTRIBUTION ACROSS A SEQUENCE OF DISPLAYS ALONG A VEHICLE PATHWAY

CROSS REFERENCE TO RELATED APPLICATION

This application is a 35 U.S.C. § 371 national stage application of PCT International Application No. PCT/EP2017/072283, filed on Sep. 6, 2017, the disclosure and content of which is incorporated herein by reference in its entirety.

TECHNICAL FIELD

The present disclosure relates generally to content delivery systems and more particularly to delivering content to sequences of display devices.

BACKGROUND

A zoetrope is an animation device that produces the illusion of motion by displaying a sequence of static drawings or photographs showing progressive phases of that motion. Zoetrope type displays of moving artwork, advertising, and other visual information have been provided along subway tunnels of some cities, including San Francisco, London, Boston, Rio de Janeiro, Beijing, Shanghai, Seoul, Tokyo. In one approach, a sequence of LCD displays is mounted along a tunnel wall, and the displays each show a different static image from a sequence of images. Passengers within a subway car moving by the displays see an animation or short film.

In one study, 90% of passengers were able to remember the content of what they observed on the images immediately after their ride, and 50% of those passengers could recall the content even months after seeing it. Moreover, as a captive audience during the ride, the passengers were more willing to observe the content provided by the displays. In view of the high volume of riders on many of these public forms of transportation, it is possible for one set of displays to deliver content to hundreds or thousands of people daily, and to provide such delivery multiple times per day to many of the same commuting passengers.

However, the effectiveness of the content delivery may be relatively short lived as passengers become bored or, worse, annoyed, over time with seeing the same zoetrope during repetitive experiences.

SUMMARY

Some embodiments disclosed herein are directed to a content distribution node for distributing content to display devices which are arranged in a spaced apart sequence along a pathway of vehicles for display to passengers of the vehicles. The content distribution node includes at least one Light Fidelity (Li-Fi) signal receiver circuit configured to receive Li-Fi signaling of messages from mobile gateway nodes transported by vehicles. At least one processor is connected to the at least one Li-Fi signal receiver circuit. At least one memory circuit stores program code that is executed by the at least one processor to perform operations. The operations include receiving from a mobile gateway node of a vehicle through the Li-Fi signal receiver circuit, a profile message containing profile information related to the vehicle that is approaching the display devices. The operations select, from among content files available in a content repository, a set of video frames of one of the content files for distribution to the display devices based on the profile information. The operations also distribute different video frames among the set of video frames to different ones of the display devices with a timing of the distribution that allows the video frames among the set to be displayed on respective ones of the display devices in the sequence before arrival of the vehicle within a field-of-view of at least one of the display devices.

A potential advantage of these operations is that content selection can be customized to characteristics of the vehicle and/or passengers of the vehicle, and then dynamically distributed to display devices along the pathway of the vehicle with timing that allows the content to be viewed by those passengers. Customizing content delivery in this manner can increase the effectiveness of its delivery to targeted passengers. Moreover, a single set of display devices can be effectively controlled to display an array of differing content over time, thereby allowing more flexible utilization of the display devices. Moreover, using Li-Fi signaling to receive the profile message can allow accurate determining of timing for distribution of selection content, thereby allowing much more granular customization of content to different passenger compartments of a train, to different windows along a side of a passenger compartment, etc.

A related method of operating a content distribution node is disclosed for distributing content to display devices which are arranged in a spaced apart sequence along a pathway of vehicles for display to passengers of the vehicles. The method includes receiving from a mobile gateway node of a vehicle, through a Li-Fi signal receiver circuit of the content distribution node, a profile message containing profile information related to the vehicle that is approaching the display devices. The method further includes selecting, from among content files available in a content repository, a set of video frames of one of the content files for distribution to the display devices based on the profile information. The method further includes distributing different video frames among the set of video frames to different ones of the display devices with a timing of the distribution that allows the video frames among the set to be displayed on respective ones of the display devices in the sequence before arrival of the vehicle within a field-of-view of at least one of the display devices.

Some other related embodiments are directed to a mobile gateway node that is transportable by a vehicle for controlling distribution of content to display devices which are arranged in a spaced apart sequence along a pathway of the vehicle for display to passengers of the vehicle. The mobile gateway node includes a Li-Fi access point circuit configured to transmit Li-Fi signaling of messages to a content distribution node that is not transported by the vehicle. At least one processor is connected to the Li-Fi access point circuit, and at least one memory circuit stores program code that is executed by the at least one processor to perform operations. The operations include obtaining profile information related to the vehicle and generating a profile message containing the profile information. The operations further include transmitting the profile message through the Li-Fi access point circuit for receipt by the content distribution node to control distribution of content by the content distribution node to the display devices that are being approached by the vehicle.

A related method of operating a mobile gateway node transportable by a vehicle, is disclosed for controlling distribution of content to display devices which are arranged in a spaced apart sequence along a pathway of the vehicle for display to passengers of the vehicle. The method includes obtaining profile information related to the vehicle and generating a profile message containing the profile information. The method further includes transmitting the profile message, as Li-Fi signaling through a Li-Fi access point circuit of the mobile gateway node, for receipt by a content distribution node to control distribution of content by the content distribution node to the display devices that are being approached by the vehicle.

Other content distribution nodes, mobile gateway nodes, and corresponding methods according to embodiments will be or become apparent to one with skill in the art upon review of the following drawings and detailed description. It is intended that all such additional content distribution nodes, mobile gateway nodes, and corresponding methods be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Embodiments of the present disclosure are directed to providing improved content delivery to passengers of vehicles. A mobile gateway node transported by a vehicle communicates with a content distribution node to control distribution of content to display devices which are arranged in a spaced apart sequence along a pathway of the vehicle for display to passengers of the vehicle.

Figure 1:
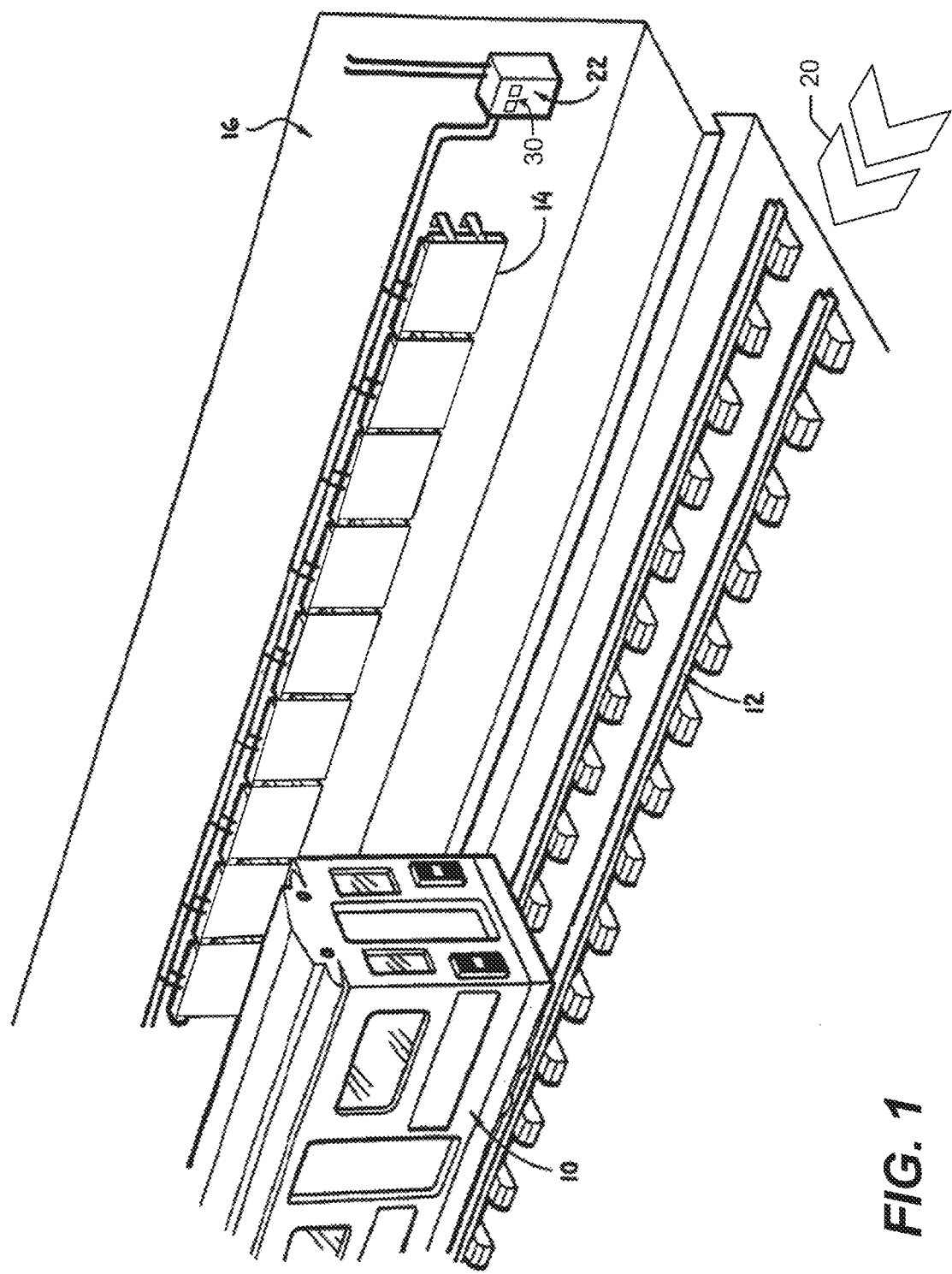
FIG. 1 illustrates a train transporting a mobile application node while moving past display devices which are arranged in a spaced apart sequence along a pathway of the train, and which operate in accordance with some embodiments of the present disclosure.

FIG. 1 illustrates a passenger compartment 10 of a train, e.g., subway, that is transporting a mobile gateway node (not shown) while moving past display devices 14 (e.g. LCD, LED, OLED, etc.) which are arranged in a spaced apart sequence along a wall 16 that follows a pathway 20 formed by the rails 12. The mobile gateway node may be mounted to a front portion of the train or may be mounted to each of the passenger compartments 10 forming the train, as explained below. The mobile gateway node may be mounted outside or inside the passenger compartment, and may be releasably mounted or otherwise transported at any location along the compartment. The mobile gateway node communicates through Light Fidelity (Li-Fi) signaling with Li-Fi signal receiver circuits 30 of a content distribution node 22. The content distribution node 22 selects content based on the received Li-Fi signaling, and controls timing of distribution of the content to the display devices 14 for viewing by passengers of the passenger compartment 10 responsive to the received Li-Fi signaling.

As will be explained in further detail below, the Li-Fi signal receiver circuits 30 can be mounted to the wall 16 at a defined distance from one or more of the display devices 14, to enable accurate determination of the speed of the passenger compartment and prediction of a time of arrival of the passengers to a field-of-view (FOV) of one or more of the display devices 14. The content distribution node 22 uses the speed and the time of arrival to control timing of the distribution of video frames of the content to the display devices 14 for viewing by the passengers.

Although various embodiments are described herein in the context of trains, such as subways, they may be applied to other types of vehicles, including road vehicles, ships, etc. The term vehicle may therefore correspond to a single passenger compartment of a train, bus, truck, or car, or may correspond to a platoon of passenger compartments forming the vehicle or a platoon of vehicles traveling a pathway along which the display devices are spaced apart. Although the display devices 14 are shown in FIG. 1 with an example gap there between, the gap may be any size, including zero, that is appropriate for displaying a sequence of video frames to passengers of a vehicle.

The term "passenger" generally refers to a human occupant of the vehicle. A passenger typically has a lateral FOV between him/her and a display device, typically through a window. A vehicle can therefore have one or more FOVs. For example, in a car, these FOVs can be four, two in the front seats and two in the back, whereas a bus or train compartment may have many more.

Example System

Figure 2:
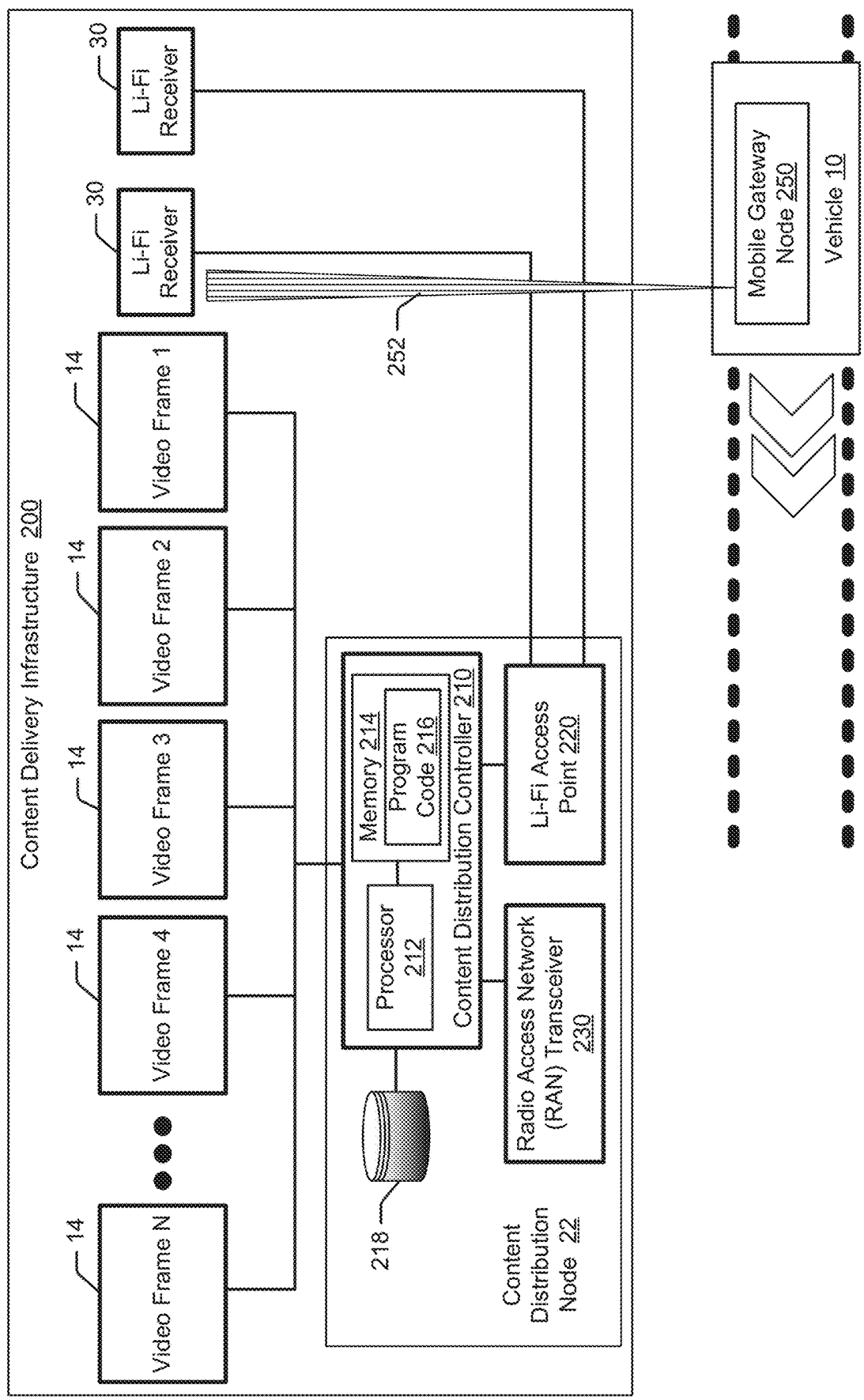
FIG. 2 is a block diagram of a system that includes a mobile gateway node transported by the vehicle of FIG. 1 that is communicating with a content delivery infrastructure using the content distribution node to control distribution of content to the display devices.

FIG. 2 is a block diagram of a system that includes a mobile gateway node 250 transported by the passenger compartment 10 of FIG. 1, and which communicates with content delivery infrastructure 200 using the content distribution node 22 to control distribution of content to the display devices 14.

Referring to FIG. 2, the mobile gateway node 250 transmits profile messages through the Li-Fi signaling 252 to the content distribution node 22. A profile message can identify vehicle features, passenger features, etc., which can be used by the content distribution node 22 to select among content files available in a content repository for distribution to the display devices 14, and to control timing of the distribution.

In the example of FIG. 2, the content distribution node 22 includes two Li-Fi receiver circuits 30 that are positioned defined distance from one or more of the display devices 14. The Li-Fi receiver circuits 30 are part of a Wi-Fi access point 220 that is configured to receive, decode, and process messages received through Li-Fi signaling. The Li-Fi signalling may use a portion of the human-visible light spectrum and/or a portion of the non-human-visible light spectrum (e.g., infrared) as a transport medium. The content distribution node 22 includes a content repository 218 that stores content files. A content distribution controller 210 includes at least one processor 212 ("processor" for brevity) and at least one memory 214 ("memory" for brevity). The processor 212 may include one or more data processing circuits, such as a general purpose and/or special purpose processor (e.g., microprocessor and/or digital signal processor) that may be collocated or distributed across one or more networks. The processor 212 is configured to execute computer program code 216 in the memory 214, described below as a non-transitory computer readable medium, to perform at least some of the operations described herein as being performed by a content distribution node. The Li-Fi access point 220 decodes the received Li-Fi signaling from the mobile gateway node 250, to output a profile message to the content distribution controller 210. The content distribution controller 210 extracts profile information on the vehicle, passengers transported by the vehicle, and/or other information which it uses to select content for distribution to the display devices 14 for viewing by the passengers.

The content distribution node 22 may further include a radio access network (RAN) transceiver 230 that is configured to communicate through a radio air interface with one or more other RANs, such as a RAN within the mobile gateway node 250, a ground-based radio base station, etc., using one or more radiofrequency protocols that can include, without limitation, 3G, LTE, NR, or other 3GPP radio access technologies, WiFi, Bluetooth, IEEE 802.15.4—based protocol stacks (e.g. Zigbee, 6LoWPAN), etc.

The content distribution controller 210 selects, from among content files available in a content repository 218, a set of video frames of one of the content files for distribution to the display devices 14 based on the profile information. As used herein, a set of video frames contains at least one video frame. For example, a single video frame could be selected for distribution to a single display device, and a N video frames could be selected for distribution to N display devices (e.g., one video frame sent to each display device). The content distribution controller 210 distributes, e.g., through a wired network such as Ethernet and/or a wireless network such as WiFi, different video frames among the set of video frames to different ones of the display devices 14 with a timing of the distribution that allows the video frames among the set to be displayed on respective ones of the display devices 14 in the sequence before arrival of the vehicle within the FOV of at least one of the display devices 14.

In the example of FIG. 2, a first video frame in the selected set is displayed on one of the display devices 14, a second video frame in the selected set is displayed on a next occurring one of the display devices 14, and so on with other video frames in the selected set being displayed on N other ones of the display devices 14 in the sequence. Accordingly, as the passengers travel past the display devices they will observe video frames 1 through N in a rapid succession, which can appear to transform the individual video frames into perception of a time-varying movie, animation, etc. Moreover, the images have been selected in a way that the content is personalized based on features reported by the mobile gateway node characterizing the vehicle and/or its passengers, such as their viewing preferences, as will be explained in further detail below.

A potential advantage of these operations is that content selection can be customized to characteristics of the vehicle and/or passengers of the vehicle, and then dynamically distributed to display devices along the pathway of the vehicle with timing that allows the content to be viewed by those passengers. Customizing content delivery in this manner can increase the effectiveness of its delivery to targeted passengers. Moreover, a single set of display devices can be effectively controlled to display an array of differing content over time, thereby allowing more flexible utilization of the display devices. Moreover, using Li-Fi signaling to receive the profile message can allow accurate determining of timing for distribution of selection content, thereby allowing much more granular customization of content to different passenger compartments of a train, to different windows along a side of a passenger compartment, etc.

Example Mobile Gateway Node

Figure 3:
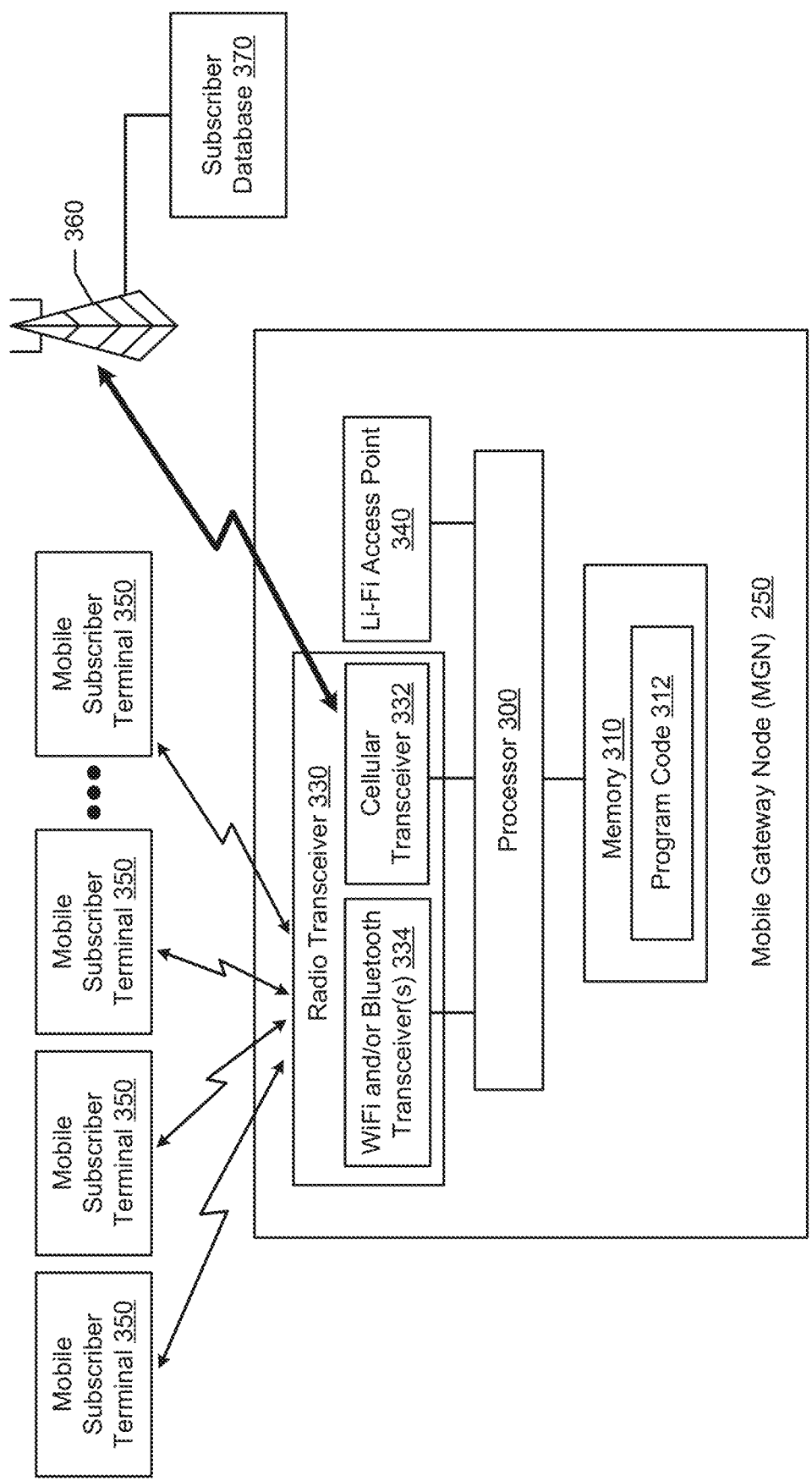
FIG. 3 is a block diagram of a mobile gateway node that communicates with mobile subscriber terminals and a subscriber database, according to some embodiments of the present disclosure.

FIG. 3 is a block diagram of a mobile gateway node 250 that communicates with mobile subscriber terminals 350 and a subscriber database 370, according to some embodiments of the present disclosure.

Referring to FIG. 3, the mobile gateway node 250 is transportable by a vehicle for controlling distribution of content to the display devices 14. The mobile gateway node 250 includes at least one Li-Fi access point circuit 220 ("Li-Fi access point circuit" for brevity), at least one processor 300 ("processor" for brevity) connected to the Li-Fi access point circuit 220, and at least one memory circuit 310 ("memory" for brevity) storing program code 312 that is executed by the processor 300 to perform operations.

Figure 9:
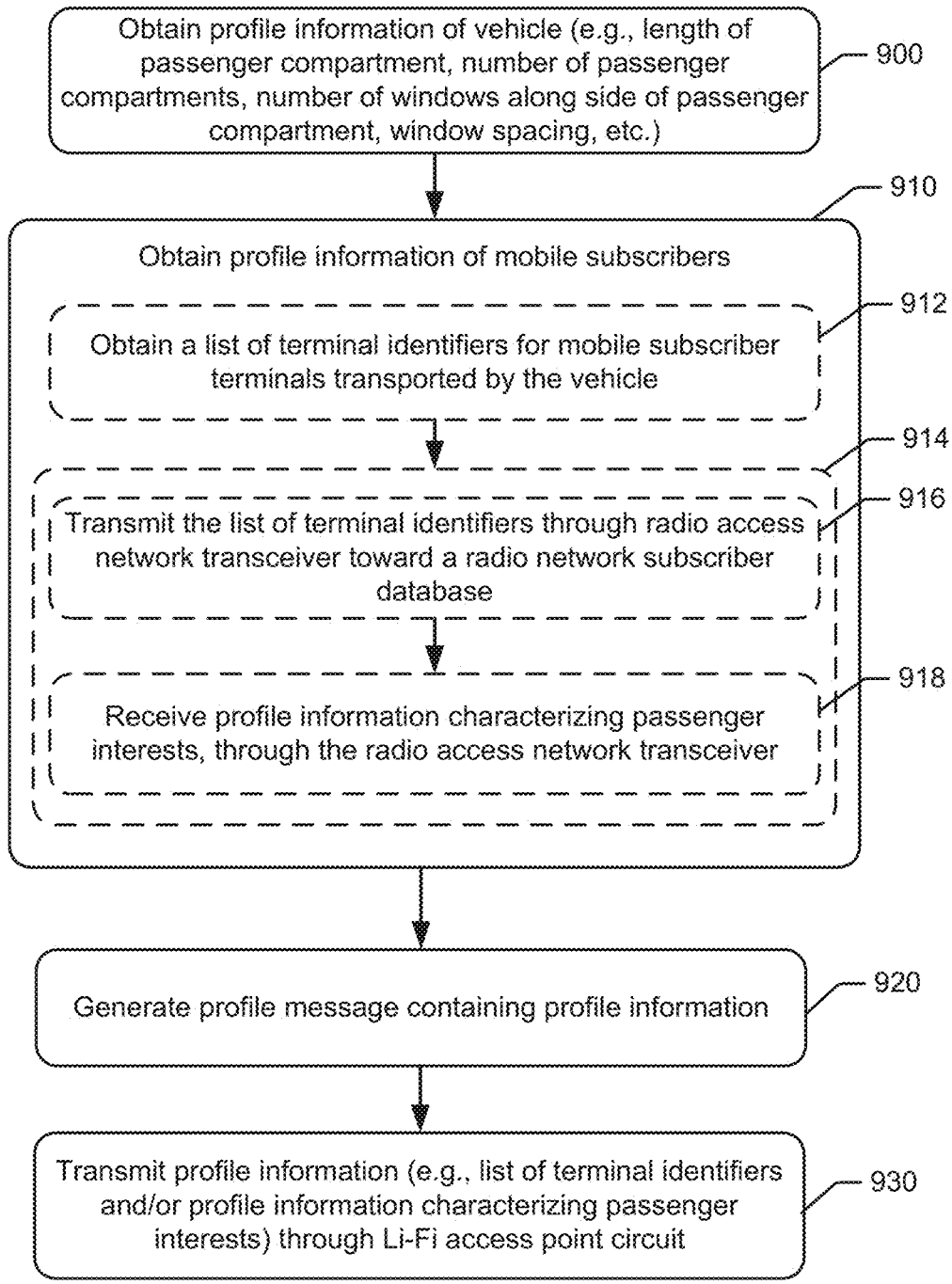
FIG. 9 is a flowchart of operations by a mobile gateway node according to some embodiments of the present disclosure.

FIG. 9 is a flowchart of example operations by the mobile gateway node 250 according to some embodiments of the present disclosure. Referring to FIGS. 3 and 9, the operations can include obtaining (blocks 900 and/or 910) profile information related to the vehicle. A profile message is generated (block 920) that contains the profile information. The profile message is transmitted (block 930) through the Li-Fi access point circuit 340 for receipt by the content distribution node 22 to control distribution of content by the content distribution node 22 to the display devices 14 that are being approached by the vehicle.

The profile information obtained (block 900) by the mobile gateway node 250 may characterize the vehicle, and may be retrieved from a local memory within the mobile gateway node 250 and/or from a remote server via a radio access network such as described below. The profile information may be an identifier for a type of passenger compartment and/or vehicle, and/or may more directly identify characteristics of the vehicle and/or passenger compartment. For example, the profile information that is included in the profile message can indicate a length of a passenger compartment of the vehicle and a number of passenger compartments forming the vehicle. Alternatively or additionally, the profile information indicates a number of windows in a sequence along one side of a passenger compartment of the vehicle and window spacing (e.g., distance between defined locations on adjacent windows). The profile information can be a designation of the class (e.g. first or second class passenger compartment), a designation of the occupants (e.g. women only car or "regular" compartment). When the vehicle is a road vehicle, the profile information can be a designation of the type of vehicle (e.g. bus, truck, car) etc. This can be implemented if the profile information is transmitted as a Vehicle Identification Number (VIN), which also describes the model of the vehicle together with manufacturer information. The VIN number should be accessible via the On-Board Diagnostic system (OBD) provided in vehicles for at least the last decade.

The mobile gateway node 250 may further include at least one radio access network transceiver circuit 330 ("radio transceiver" for brevity) configured to communicate with mobile subscriber terminals 350 being transported within the passenger compartment. The radio transceiver 330 may include, without limitation, a cellular transceiver 332 (e.g., operating according to one or more of 3G, LTE, NR, or other 3GPP radio access technologies), a Wi-Fi transceiver 334 (e.g., IEEE 902.11), and/or Bluetooth transceiver 334, and/or other radio communication transceiver technology.

In some other embodiments, the mobile gateway node 250 generates the profile information to characterize passengers of the vehicle. For example, the profile information may characterize the number of passengers being transported. The number of passengers may be determined based on assuming that the number of detected mobile subscriber terminals 350 attached to the radio transceiver 330 of the mobile gateway node 250 is equal to the number of passengers.

The operations by the mobile gateway node 250 to obtain (block 910) the profile information can include communicating with the mobile subscriber terminals 350 through the radio transceiver circuit 330 to generate a list of their respective terminal identifiers and/or to perform other mobile subscriber profiling.

The mobile subscribers are typically users of cellular devices such as phones, tablets or laptops connecting to the Internet via the radio transceiver 330 of the mobile gateway node 250. The mobile gateway node 250 may utilize radio access features and other operational functionality based on Ericsson's Radio Dot System products. The mobile subscriber terminals 350 may use the WiFi transceiver 334 to connect via a single mobile network subscription to the Internet, or a small-cell solution such as a picocell, wherein mobile subscriber terminals 350 connect on a cellular radio node 360 (FIG. 3) directly, via their cellular transceiver 332. Note that in the former option, the limited range radio is not limited to 902.11-based protocol stack, but instead may be Bluetooth, IEEE 902.15.4-based low-power short-range radio such as 6LowPAN (IPv6 over Low power Wireless Personal Area Networks), etc.

In one embodiment, the mobile gateway node 250 transmits (block 916) the list of terminal identifiers for the mobile subscriber terminals 350 through the radio transceiver 330 toward a subscriber database 370, such as a cellular subscriber database. The mobile gateway node 250 responsively receives (block 918) at least a portion of the profile information through the radio transceiver 330 from the subscriber database, where the at least a portion of the profile information characterizes interests of passengers who are associated with the list of terminal identifiers for the mobile subscriber terminals 350. The characterization of passengers' interests may correspond to information indicating the passengers' historical shopping, historical media viewing, historical web browsing, travel itinerary, home address, ages, hobbies and preferences (e.g., from accessing social media profiles), gender, work information, etc.

This information may alternatively or additionally be retrievable over the top (OTT) using incentives, e.g. giving the users Wi-Fi access via a captive portal by asking them to provide access to their social media profiles (e.g. Facebook, Linkedin) credentials.

Because of the potential confidential nature of such information, the transmitted portion of the profile information can be encrypted to prevent interception through the radio interface signaling. The mobile gateway node 250 then includes the at least a portion of the profile information in the profile message that is generated (block 920). The generated profile message is transmitted (block 930) through the Li-Fi access point circuit 340 for receipt by the content distribution node 22.

In an alternative or additional embodiment, the mobile gateway node 250 includes the list of terminal identifiers in the profile message that is generated (block 920). The generated profile message is transmitted (block 930) through the Li-Fi access point circuit 340 for receipt by the content distribution node 22. Accordingly, the list of terminal identifiers may be sent to the content distribution node 22, which then communicates with the subscriber database 370 to obtain the profile information characterizing passengers, such as their interests. Because of the potential confidential nature of list of terminal identifiers, it can be encrypted to prevent interception through the radio interface signaling.

In another embodiment, the profile message doesn't characterize the vehicle and/or its passengers, but instead functions to notify the content distribution node 22 of arrival of the vehicle at a defined distance from one of the display devices 14.

The mobile gateway node 250 may repetitively transmit profile messages. The transmission rate should be configured to be sufficiently fast so that, for any expected range of the vehicle speed, both of the Li-Fi receiver circuits 30 of the content distribution node 22 are assured of being able to receive at least one profile message from the transmissions, which can then allow accurate determination of the speed of the vehicle based on timing between receipt of the profile messages at the spaced apart Li-Fi receiver circuits 30.

Figure 7:
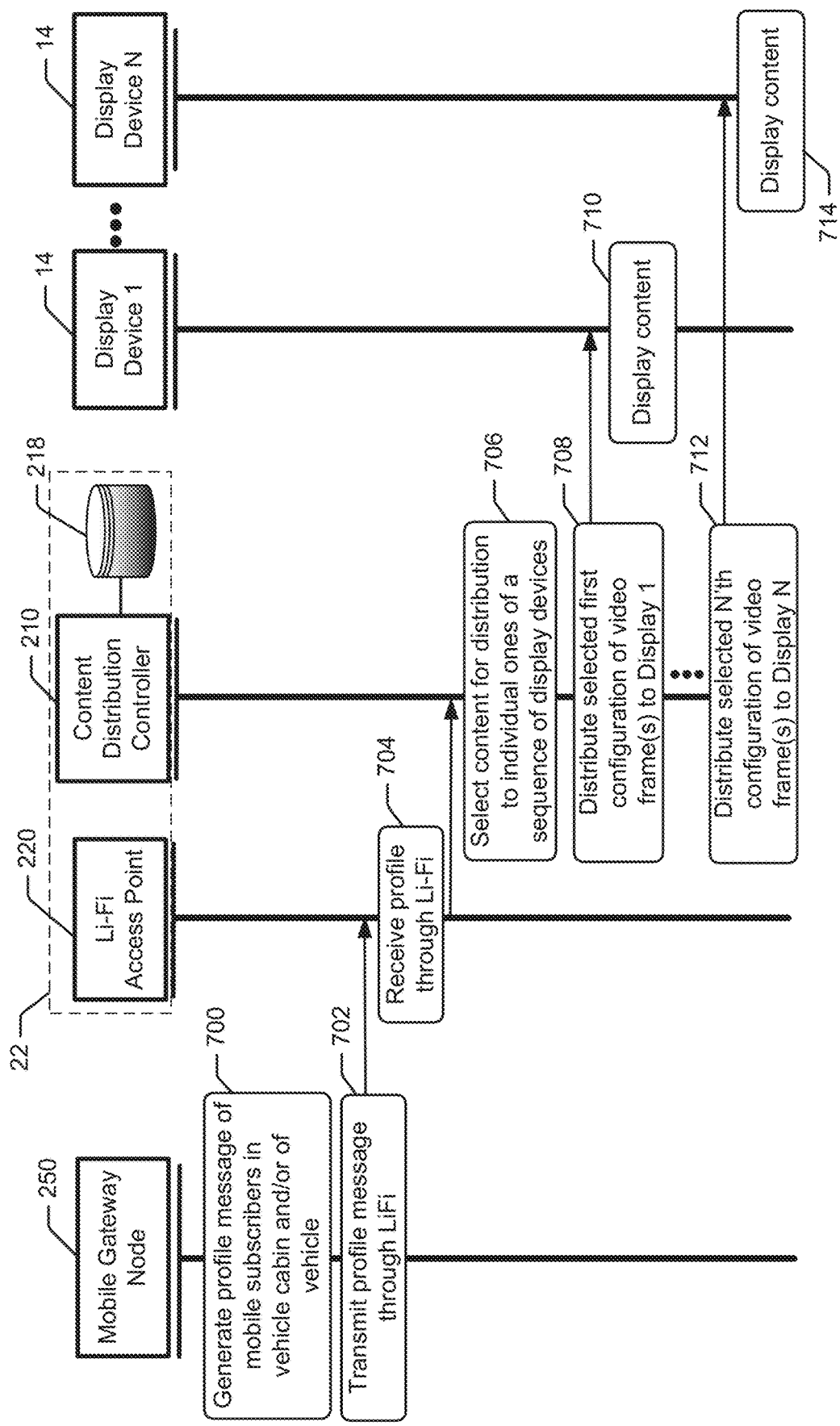
FIG. 7 is a data flow diagram and flowchart of operations by a mobile gateway node, a content distribution node, and display devices according to some embodiments of the present disclosure.

FIG. 7 is a data flow diagram and flowchart of operations by the mobile gateway node 250, the content distribution node 22, and display devices 14 according to some embodiments of the present disclosure.

Referring to FIG. 7, mobile gateway node 250 generates (block 700) a profile message containing profile information characterizing mobile subscribers in a passenger compartment and/or a profile of the vehicle. The profile message is transmitted through the Li-Fi access point 340. Within the content distribution node 22, the Li-Fi access point 220 receives (block 704) the profile message, and provides a profile message to the content distribution controller 210. The controller 210 selects (block 706), from among content files available in the content repository 218, a set of video frames of one of the content files for distribution to the display devices 14 based on the profile information. The controller 210 then distributes (block 708 and/or 712) different video frames among the set of video frames to different ones of the display devices 14 with a timing of the distribution that allows the video frames among the set to be displayed on respective ones of the display devices 14 in the sequence before arrival of the vehicle (e.g., arrival of a first one of the passenger compartments, a first one of the passenger compartments, and/or a particular window along one side of a passenger compartment) within a field-of-view of at least one of the display devices 14.

In the example of FIG. 7, the controller 210 distributes (block 708) a selected first configuration of one or more video frames to a first one of the display devices 14 "display 1", which displays (block 710) the content. The controller 210 also distributes (block 712) a selected N'th configuration of one or more video frames to an N'th one of the display devices 14 "display N", which displays (block 714) the content. As will be explained below, each of the configurations of video frames can be different, so that different ones of the display devices 14 display a different video frame or a different set of video frames than other ones of the display devices 14.

Further Example Operations by a Content Distribution Node

In various embodiments, the content distribution node 22 uses the profile information received from an approaching vehicle to choose the content to be displayed in the sequence of display devices 14 under its control. The choice of content can be based on contextual parameters, for example the weather, location, time of day, calendar day (e.g. workday, weekend, vacation), vehicle type (e.g. in case of a train compartment this could be a "women only" compartment, 1st, 2nd, . . . X class compartment, number of compartments forming the vehicle, number of windows along the side of the compartment), etc.

The content distribution node 22 may apply two different types of contextual criteria when choosing content. The first set of criteria are contextual parameters, that are related to the environment rather than the vehicle itself. These parameters can be, but are not limited to, weather, location, time and calendar day. The second set of criteria can be vehicle parameters that are supplied by the vehicle itself. As explained above, such parameters can be a type of the vehicle (e.g. first/second class or "women only" train compartment, passenger car or bus or truck, and/or number of windows along the side of the compartment).

There are various different operations that can be performed to display different video/animation to different passengers, such as to passengers within different vehicles, passengers within different compartments forming a same vehicle (e.g., multiple passenger compartments of a train), and/or rows of passengers associated with different windows along the side of a compartment.

In one embodiment, the content distribution node 22 distributes a different frame of a video stream to different ones of the display devices 14, for static display during passage of the passengers in a vehicle or portion thereof. This approach may be useful when the speed of the vehicle is relatively fast. In this approach, passengers in the same vehicle or portion thereof will see one video frame per display device. For each display device, the content distribution node 22 can control distribution of video frames so that different video frames are timed for display to different vehicles or defined portions thereof (e.g. different passenger compartments and/or different windows along a side of a passenger compartment), so that different passengers or groups of passengers observe different video/animations.

Figure 4:
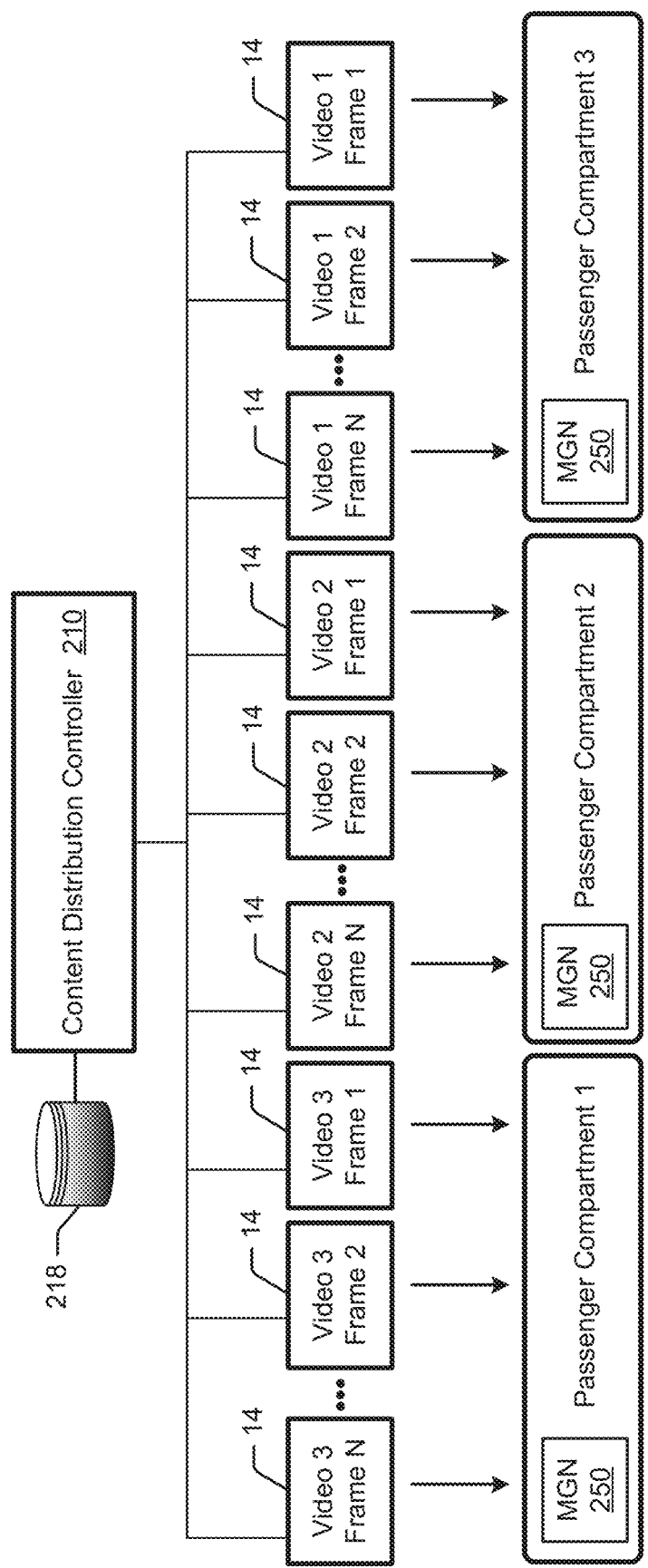
FIG. 4 is a block diagram illustrating operations by a content distribution controller to select and distribute sets of video frames from various selected content so that different passenger compartments view sequences of video frames of different selected content, according to some embodiments of the present disclosure.

FIG. 4 is a block diagram illustrating operations by the content distribution controller 210 to select and distribute sets of video frames from various selected content so that different passenger compartments view sequences of video frames of different selected content. Referring to FIG. 4, different content has been selected for display to different vehicle cabins, and a set of video frames of the content is distributed to the display devices 14 so that it is timed for display before arrival of the respective passenger compartment to a FOV of the display devices. For example, video frames 1-N of content video 3 are distributed to the displays 14 for display before arrival of the passenger compartment 1 to their FOV. Subsequently, video frames 1-N of content video 2 are distributed to the displays 14 for display before arrival of the passenger compartment 2 to their FOV. Subsequently, video frames 1-N of content video 1 are distributed to the displays 14 for display before arrival of the passenger compartment 3 to their FOV.

In contrast, if the number of display devices 14 and their spaced apart length along the pathway is sufficient so that they can be simultaneously viewed by a plurality of the vehicle cabins, such as passenger compartments 1-3, the content distribution controller 210 can distribute the video frames 1-N of content videos 1-3 to those display devices 14 so that passengers in passenger compartment 1 are sequentially viewing frames 1-N of content video 3 while passengers in passenger compartment 2 are sequentially viewing frames 1-N of content video 2 and while passengers in passenger compartment 3 are sequentially viewing frames 1-N of content video 1. Accordingly, a video frame can be delivered to one display device for viewing as one passenger compartment moves into its FOV, and then another video frame can be delivered to that display device in time to be viewed by a next passenger compartment moving into its FOV.

Figure 5:
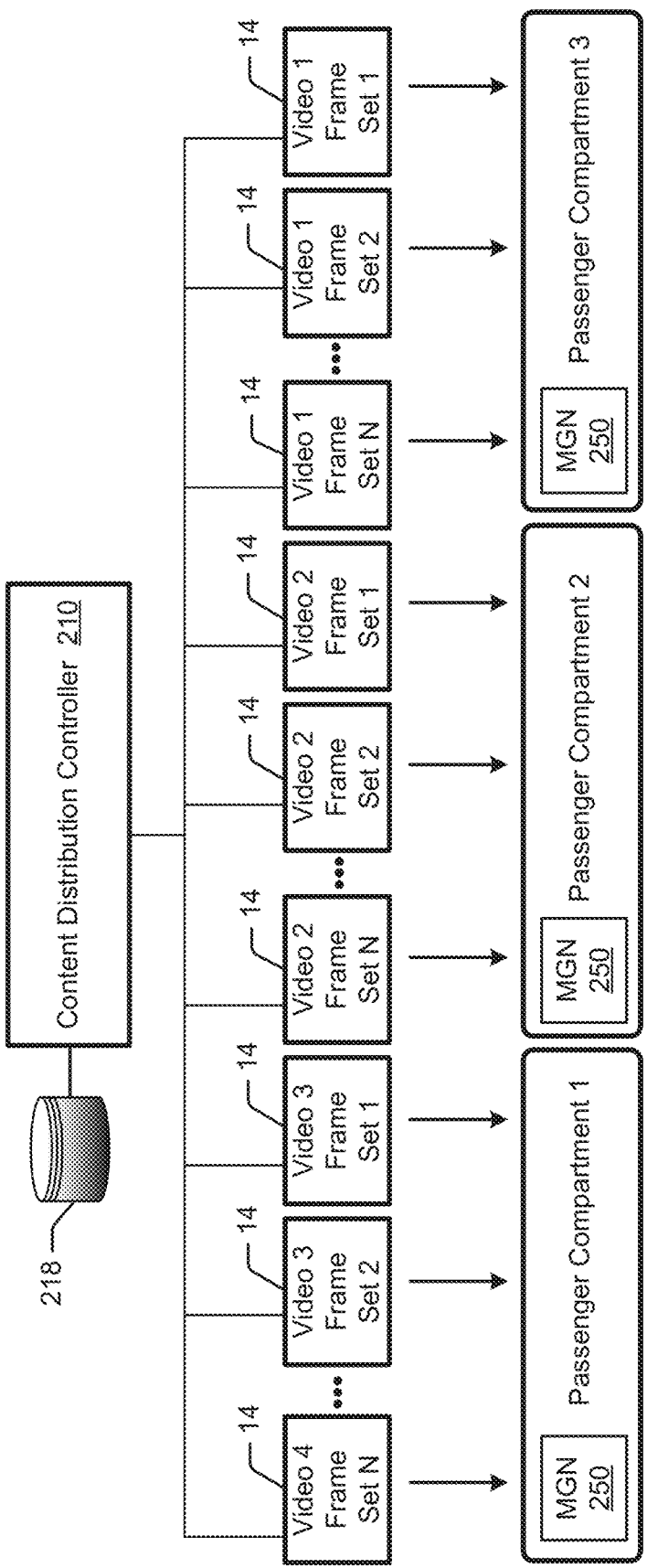
FIG. 5 is a block diagram illustrating operations by a content distribution controller to select and distribute sets of video frames from various selected content so that different passenger compartments view sequences of sets of video frames of different selected content, according to some embodiments of the present disclosure.

When the vehicle is moving at a sufficiently slow speed that the passengers may not sufficiently observe a fluidly moving image as opposed to a sequence of static images with gaps therebetween, the content distribution controller 210 may responsively provide a plurality of video frames, referred to as a set of video frames, to each of the display devices 14. FIG. 5 is a block diagram illustrating operations by the content distribution controller 210 to select and distribute sets of video frames from various selected content so that different passenger compartments view sequences of sets of video frames of different selected content.

Referring to FIG. 5, different content has been selected for display to different vehicle cabins, and sets of video frames of the content are distributed to each of the display devices 14 so that they are timed for display before arrival of the respective passenger compartment to a FOV of the display devices. For example, video frame sets 1-N, where N is a plural integer, of content video 3 are distributed to the displays 14 for display before arrival of the passenger compartment 1 to their FOV. Subsequently, video frame sets 1-N of content video 3 are distributed to the displays 14 for display before arrival of the passenger compartment 2 to their FOV. Subsequently, video frame sets 1-N of content video 3 are distributed to the displays 14 for display before arrival of the passenger compartment 1 to their FOV.

Accordingly, passengers in passenger compartment 1 will observe a plurality of video frames of set 1 on one display device, then observe a plurality of video frames of set 2 on a next occurring display device, then observe a plurality of video frames of set 3 on a next occurring display device, and, so on, to subsequently observe a plurality of video frames of set N on the N'th occurring display device.

Figure 6:
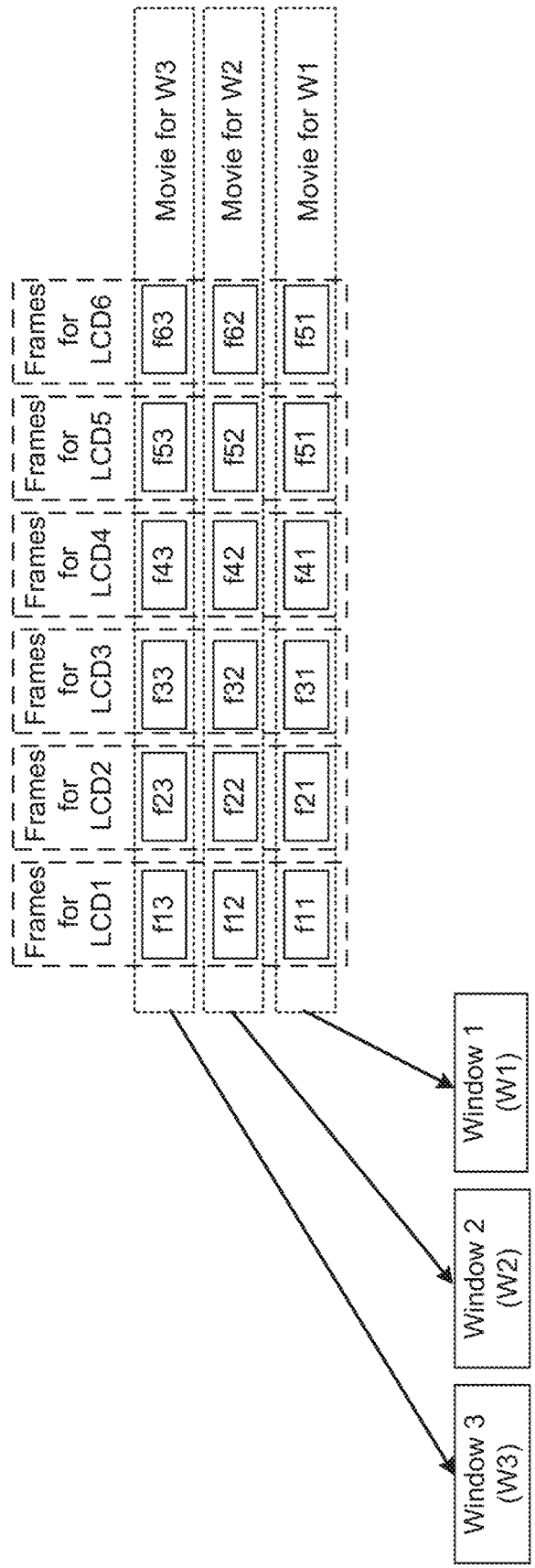
FIG. 6 is a block diagram illustrating operations by a content distribution controller to select and distribute sets of video frames from various selected content so that different windows along a side of a passenger compartment view sequences of video frames of different selected content, according to some embodiments of the present disclosure.

In another embodiment, the content distribution controller 210 can select different content for viewing by passengers positioned at different windows along a side of a same passenger compartment. FIG. 6 is a block diagram illustrating operations by the content distribution controller 210 to select and distribute sets of video frames from various selected content so that different windows along a side of a passenger compartment view sequences of video frames of different selected content.

Referring to FIG. 6, different video/animations are displayed by the display devices 14 to different windows. These operations may more easily performed when the vehicle speed is relatively slow. Without this approach, showing a single video frame in each monitor would create for passengers a sense that the video is either static or too artificially animated. To avoid such negative observation, multiple video frames can be displayed.

In the example shown in FIG. 6, video frames are distributed to the display devices with a timing so that different windows see different movies. A first movie is formed by distributing a sequence of video frames f11, f21, f31, f41, f51, f61 respectively to different display devices LCD1, LCD2, LCD3, LCD4, LCD5, LCD6, with a timing so that the movie is viewed by compartment window 1 (W1). As W1 leaves the FOV of individual ones of the display devices, that one of the display devices can receive a next video frame for display before the next occurring compartment window 2 (W2) enters the FOV. Thus a second movie is formed by distributing another sequence of video frames f12, f22, f32, f42, f52, f62 respectively to different display devices LCD1, LCD2, LCD3, LCD4, LCD5, LCD6 with a timing so that the movie is viewed by W2. Similarly, as W2 leaves the FOV of individual ones of the display devices, that one of the display devices can receive a next video frame for display before the next occurring compartment window 3 (W3) enters the FOV. Thus, a third movie is formed by distributing a sequence of video frames f13, f23, f33, f43, f53, f63 respectively to different display devices LCD1, LCD2, LCD3, LCD4, LCD5, LCD6 with a timing so that the movie is viewed by W3.

Further Content Selection and Distribution Operations

Figure 8:
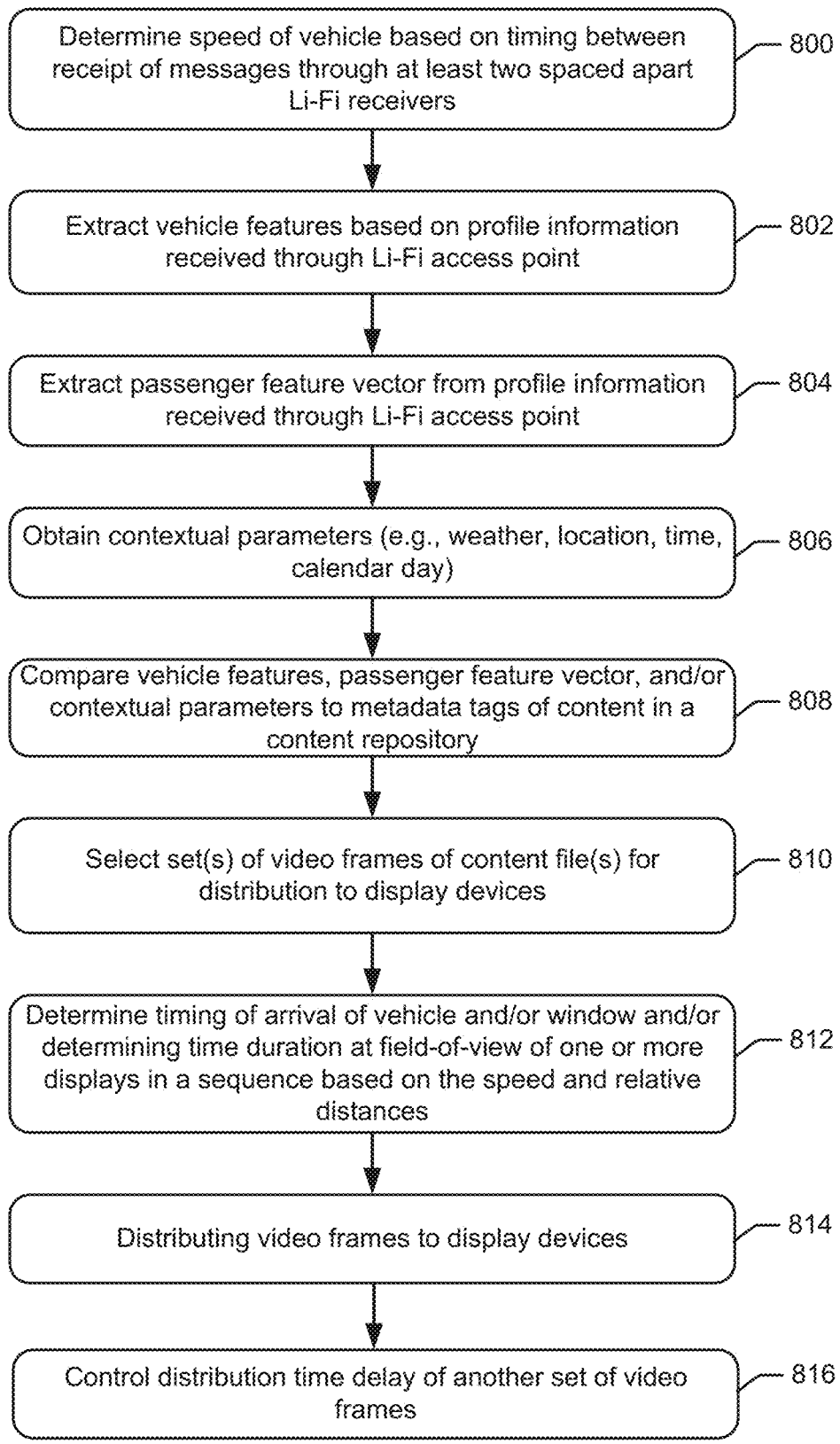
FIG. 8 is a flowchart of operations by a content distribution node according to some embodiments of the present disclosure.

FIG. 8 is a flowchart of operations by the content distribution node 22 according to some embodiments of the present disclosure. Referring to FIG. 8, speed of the vehicle is determined based on the Li-Fi signaling received from the vehicle and, more particularly, by receiving two profile messages, each from a different one the Li-Fi signal receiver circuits 30, and determining the speed of the vehicle based on elapsed time between receipt of the two profile messages and distance between the Li-Fi signal receiver circuits 30.

The content distribution node 22 may determine (block 812) time-of-arrival of the vehicle to a field-of-view of at least one of the display devices 14 based on timing of receipt of Li-Fi signaling from the mobile gateway node 250 of the vehicle and the speed of the vehicle. Timing of the distribution (block 814) of the video frames is controlled based on the time-of-arrival of the vehicle to the field-of-view of at least one of the display devices 14.

As part of the receiving operation (block 704 of FIG. 7), the content distribution node 22 may extract (block 804) a passenger feature vector from the profile information that characterizes interests of passengers in the vehicle. The content that is to be displayed can be selected (block 706 of FIG. 7) based on comparing (block 808) the passenger feature vector to metadata tags associated with the content files stored in the content repository, and selecting (block 810) the set of video frames of the content file based on the comparison of the passenger feature vector to the metadata tags.

The receiving operation (block 704 of FIG. 7) may additionally or alternatively include extracting (block 802) a vehicle feature from the profile information that characterizes the vehicle. The selecting operation (block 706 of FIG. 7) can include comparing the vehicle feature to metadata tags associated with the content files stored in the content repository 218, and selecting the set of video frames of the content file based on the comparison of the vehicle feature to the metadata tags.

Contextual parameters, such as weather, location, time, calendar day, etc., can be obtained (block 806) and used to select (block 810) a set of video frames of a content files for distribution to the display devices 14.

The content distribution node 22 determines (block 812) timing of arrival of the vehicle, a passenger compartment, and/or a window of a passenger compartment, to a FOV of one or more of the display devices 14, and controls distribution (block 814) of the video frames to the display devices so that they are displayed before arrival of the vehicle or defined part thereof (e.g., passenger compartment and/or window thereof).

The content distribution node 22 may determine (block 812) a time duration of the vehicle, passenger compartment, and/or window thereof at the FOV of the one or more display devices. For example, the node 22 may determine (block 804) based on the vehicle feature, a length of at least one passenger compartment of the vehicle, and then determine (block 804) a time duration during which passengers in the passenger compartment will remain in the FOV of the at least one of the display devices 14, based on the speed of the vehicle and the length of the at least one passenger compartment. The distributing operation (blocks 708 and 712) can include controlling (block 816) a distribution time delay, which is determined based on the time duration, before a subsequent distribution is allowed of another set of video frames that is selected for distribution to the display devices 14 for viewing by passengers in another vehicle.

As explained above regarding FIG. 4, the content distribution node 22 can select different content to be viewed by different passenger compartments, and distribute video frames of the selected content so that they are displayed before arrival of the corresponding compartment to a FOV of one or more of the display devices 14. With reference to FIGS. 4 and 8, the content distribution node 22 determines (block 800) speed of the vehicle based on the Li-Fi signaling received from the mobile gateway node 250 of the vehicle, and determines (block 802) based on the vehicle feature, a number of passenger compartments forming the vehicle.

For each of the number of passenger compartments forming the vehicle, the content distribution node 22 repeats operations to: extract (block 804) a passenger feature vector from the profile information that characterizes interests of passengers in the passenger compartment; compare (block 808) the passenger feature vector to metadata tags associated with the content files stored in the content repository; select (block 810) a set of video frames of a content file based on the comparison of the passenger feature vector to the metadata tags; determine (block 812) a time duration during which passengers in the passenger compartment will remain in the field-of-view of the group of the display devices 14, based on the speed of the vehicle and the length of the at least one passenger compartment; distribute (block 814) different video frames among the set of video frames to different ones of the display devices 14 with a timing of the distribution that allows the video frames among the set to be displayed on respective ones of the display devices 14 in the sequence before arrival of the passenger compartment within the field-of-view of a group of the display devices 14; and control (block 816) a distribution time delay, which is determined based on the time duration, before a subsequent distribution is allowed of another set of video frames that is selected for distribution to the display devices 14 for viewing by passengers in another one of the passenger compartments.

As explained above regarding FIG. 6, the content distribution node 22 can select different content to be viewed by different windows along a side of a passenger compartment, and distribute video frames of the selected content so that they are displayed before arrival of the corresponding window to a FOV of one or more of the display devices 14. With reference to FIGS. 6 and 8, the content distribution node 22 determines (block 800) speed of the vehicle based on the Li-Fi signaling received from the mobile gateway node (250) of the vehicle. A vehicle feature is extracted (block 802) from the profile information that characterizes the vehicle, and the content distribution node 22 determines (block 802) based on the vehicle feature, a number of windows in a sequence along one side of a passenger compartment of the vehicle and window spacing. The content distribution node 22 then selects (block 810) content files for display to the windows of the vehicle based on the comparison of the vehicle feature to metadata tags associated with the content files stored in the content repository, wherein at least two different content files are selected for display to at least two different ones of the windows based on the comparison.

For each of the windows along the side of the passenger compartment, the content distribution node 22 repeats operations to: determine (block 812) time-of-arrival of the window to a FOV of one of the display device based on timing of receipt of the Li-Fi signaling from the mobile gateway node 250 of the vehicle, a sequence location of the window among the windows, and the window spacing; obtains (block 814) a set of video frames of the content file which has been selected for display to the window; and distributes (block 814) different ones of the video frames among the set of video frames to different ones of the display devices 14 with a timing of the distribution so individual ones of the video frames are sequentially displayed on the different ones the display devices 14 with timing synchronized to the arrival of the window within the FOV of the respective ones of the display devices 14.

In a further embodiment associated with FIG. 6, the content distribution node 22 repeats for each of the number of windows along the side of the passenger compartment, operations to: determine (block 812) a window time duration during which the window will remain in the FOV of the respective ones of the display devices 14, based on the speed of the vehicle; and control (block 814) a number of the video frames among the set that are distributed to each of the different ones of the display devices 14 for display based on the speed of the vehicle.

In another further embodiment associated with FIG. 6, the operation to control (block 814) the number of the video frames among the set that are distributed to each of the different ones of the display devices 14 for display based on the speed of the vehicle, includes: distributing (block 708) a first number of the video frames among the set to each of the different ones of the display devices 14 for display when the vehicle is determined to have a first speed; and distributing (block 712) a second number of the video frames among the set to each of the different ones of the display devices 14 for display when the vehicle is determined to have a second speed, wherein the first number is greater than the second number, and wherein the first speed is less than the second speed.

The content distribution node 22 may determine (block 800) speed of the vehicle based on the Li-Fi signaling received from the mobile gateway node 250 of the vehicle, and controlling (blocks 814, 706, and 708) a number of the video frames among the set that are distributed for display on each of the display devices 14 based on the speed of the vehicle. The operations for controlling (blocks 814, 706, and 708) can include increasing the number of the video frames among the set that are distributed for display on each of the display devices 14 responsive to a lower speed of the vehicle being determined, and decreasing the number of the video frames among the set that are distributed for display on each of the display devices 14 responsive to a higher speed of the vehicle being determined.

Synchronizing Train Speed and Frame Change in Monitors

To show different video frame(s) to different groups of passengers (e.g., with different vehicles, passenger compartments, and/or viewing three different windows), distribution of video frames to each display device needs to be synchronized with the precise time of arrival of the next group of passengers. To do this, the mobile gateway node 250 is equipped to transmit Li-Fi signaling using, for example, a directional, high-frequency light source such as a light-emitting diode (LED). The content distribution node 22 receives the Li-Fi signaling through a set of Li-Fi receiver circuits 30.

As explained above, two Li-Fi receiver circuits 30 have a known space between them. The speed is determined by dividing the distance between the Li-Fi receiver circuits 30 by the difference of timestamps indicating when the Li-Fi signaling was received by one circuit 30 minus when the Li-Fi signaling was received by the other circuit 30. The distance between these Li-Fi receiver circuits 30 and one or more of the display devices 14 is also known a priori. Therefore, given the speed of the mobile gateway node 250 and its distance from the one or more display devices 14, the content distribution node 22 node determines timing for when to schedule distribution of the video frames to the display devices 14.

An example non-limiting algorithm for scheduling content distribution to the display devices 14 is explained below. In this algorithm, it is assumed that there exists a sufficient number of the display devices 14 to display the content at an acceptable number of frames per second (see f below) to passengers.

The algorithm disclosed below has terms defined as follows:

Let l be the length of a display device expressed in meters, where each display device is assumed to have a same length.

Let v be the velocity of the mobile gateway node in m/sec

Let d be the distance of the mobile gateway node in meters from the nearest display device Let f be the number of frames per second (FPS) which are to be perceived as motion by the passenger's human eye. The FPS may be f=25 FPS, although more fluid motion can be obtained by a higher FPS, such as f=60.

Let cont={$cont_1$, $cont_K$} be the set of K video frames of the chosen content file for the given group of passengers.

The algorithms includes the following steps. Step 1 determines the number of display devices that the group of passengers traverses per second, displays/sec=v/l. If v/l is float than get the ceiling of the float (i.e. round up to next available integer). Step 2 determines how many frames per display device are to be displayed, frames/display=f/(displays/sec). If frames/display is not an integer, then use ceiling function to round up to next available integer. For convenience, frames/display will be abbreviated as fpscr. Step 3 splits cont into equal buckets of content in terms of frames for each of the displays devices, as follows:

Let x∈ X, where X={0, 1, . . . , y} the y display device in the sequence of display devices. Then ContentForDisplay$_x$={$cont_{fscr*x}$, $cont_{fscr*x+x}$}

Step 4 determines the time to send content to displays: t(init)=d/v. Step 5 (after t(init) has elapsed and every 1/(display/sec) sec, while there exist more ContentForDisplay entries, operations repeat to perform: Set variable counter=0; Send ContentForDisplay$_{counter}$ to display having the ID counter identifier; and add 1 to the counter.

Further Operations for Selecting Content Based on Passenger Feature Vectors

As explained above regarding FIGS. 7 and 8, content can be selected (block 706 and 810) based on characteristics of passengers in a vehicle and/or based on characteristics of the vehicle, which are determined based on the Li-Fi signaling received from the mobile gateway node 250 mounted to a vehicle or each compartment thereof. Mapping multiple user profiles to different content files in the content repository 218 can be based on various classification operations. These operations can operate to select K different content files for display to K different groups of passengers. Groups of passengers can correspond to a number of passengers in a vehicle or a designated portion of the vehicle, such as a passenger compartment or window. The group of passengers is then used to identify a most suitable content file for display. The characteristics can include, for example:

There can be multiple parameters used to select content files, which can include, explained above: the type of vehicle; the time of day (morning or afternoon rush hour for example, or evening); the calendar date (e.g. weekday/weekend or "special day" such as national day); the number of passengers; passenger demographics (age, preferences/hobbies, gender, etc.); the weather, which can be obtained from a networked web-server; the location of the display devices, such as being close to a particular subway station, town, etc. Some of this information may be hardcoded in the mobile application node 250 or may be obtained using positioning systems such as GPS. The parameters can further include knowledge of current events in the area of the monitor array (e.g. via RSS feeds).

The content files in the repository 218 can have associated metadata tags. This metadata can identify a target group (age and gender), any content restriction (e.g. suitability ratings), the type of product or service advertised (described hierarchically, for example women beauty/hair products/conditioner), etc.

In the example below, it is assumed that content selection is based on passenger information, i.e. number of passengers and passenger interests. Each passenger is transporting a mobile subscriber terminals 350 having a telecom operator subscription. A subscriber database 370 stores a feature vector for each passenger representing their interests. Such interests can be either provided by users themselves, or automatically derived from analyzing user data in the mobile network, social media mining, to provide a passenger feature vector ("p") as shown below:

$$p_i = \begin{bmatrix} f_{i1} \\ f_{i2} \\ f_{i3} \\ \ldots \\ f_{iN} \end{bmatrix}$$

Summing the passenger feature vectors ("p") for all passengers in the same defined vehicle or portion thereof, and divided by the number of passengers ("m"), provides the average feature vector ("x") for a particular vehicle or portion thereof, $j_{th}$, as provided by the equation below:

$$x_j = \frac{p_1 + p_2 + p_3 + p_4 \ldots + p_m}{m}$$

A softmax regression or multinomial logistic regression can be used to derive the class "he" of this particular vehicle or portion thereof, as shown below:

$$h_\theta(x) = \begin{bmatrix} P(y=1 \mid x;\theta) \\ P(y=2 \mid x;\theta) \\ \vdots \\ P(y=K \mid x;\theta) \end{bmatrix} = \frac{1}{\sum_{j=1}^{K} \exp(\theta^{(j)T}x)} \begin{bmatrix} \exp(\theta^{(1)T}x) \\ \exp(\theta^{(2)T}x) \\ \vdots \\ \exp(\theta^{(K)T}x) \end{bmatrix}$$

Where θ denotes all the parameters of the model, θ is a n-by-K matrix where n is number of different groups of passengers to be shown different content files, as shown below:

$$\theta = \begin{bmatrix} | & | & | & | \\ \theta^{(1)} & \theta^{(2)} & \ldots & \theta^{(K)} \\ | & | & | & | \end{bmatrix}$$

Cloud Implementation

Some or all operations described above as being performed by the content distribution node 22 may alternatively be performed by another node that is part of a mobile network operator cloud computing resource. For example, those operations can be performed as a network function that is close to the edge (i.e. in the CloudRAN) or in the core network.

Example Modules for Content Distribution Nodes and Mobile Gateway Nodes

Figure 10:
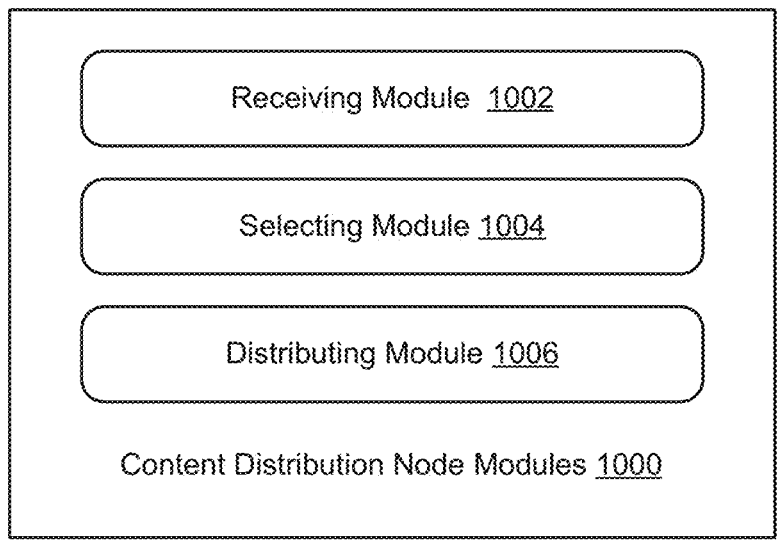
FIG. 10 is a block diagram of modules forming a content distribution node that are configured according to some embodiments of the present disclosure.

FIG. 10 is a block diagram of modules 1000 forming a content distribution node 22 that are configured according to some embodiments of the present disclosure. Referring to FIG. 10, the modules 1000 include a receiving module 1002, a selecting module 1004, and a distributing module 1006. The receiving module 902 is configured for receiving from a mobile gateway node of a vehicle through a Li-Fi signal receiver circuit, a profile message containing profile information related to the vehicle that is approaching the display devices. The selecting module 1004 is configured for selecting, from among content files available in a content repository, a set of video frames of one of the content files for distribution to the display devices based on the profile information. The disturbing module 1006 is for distributing different video frames among the set of video frames to different ones of the display devices with a timing of the distribution that allows the video frames among the set to be displayed on respective ones of the display devices in the sequence before arrival of the vehicle within a field-of-view of at least one of the display devices. One or more of the modules may be configured to perform any of the other operations for one or more of embodiments of a content distribution node disclosed herein.

Figure 11:
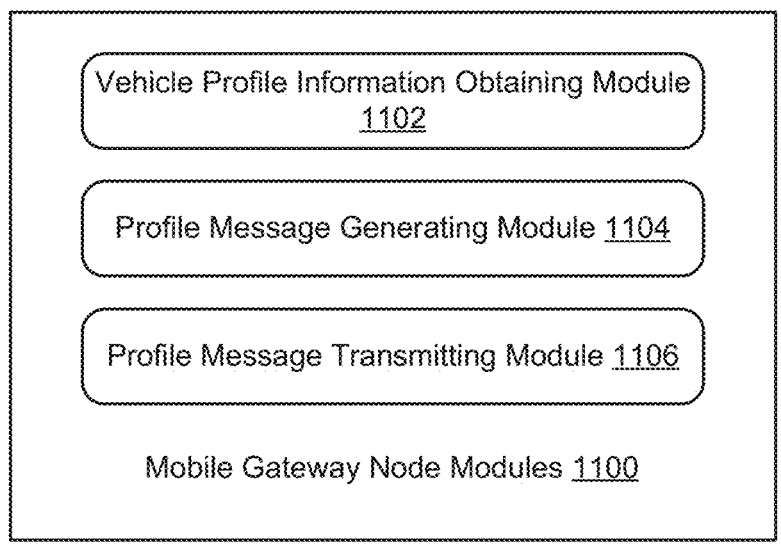
FIG. 11 is a block diagram of modules forming a mobile gateway node that are configured according to some embodiments of the present disclosure.

FIG. 11 is a block diagram of modules 1100 forming a mobile gateway node that are configured according to some embodiments of the present disclosure. Referring to FIG. 11, the modules 1100 include a vehicle profile information obtaining module 1102, a profile message generating module 1104, and a profile message transmitted module 1106. The vehicle profile information obtaining module 1102 is configured for obtaining profile information related to the vehicle. The profile message generating module 1104 is configured for generating a profile message containing the profile information. The profile message transmitted module 1106 is for transmitting the profile message through the Li-Fi access point circuit for receipt by the content distribution node to control distribution of content by the content distribution node to the display devices. One or more of the modules may be configured to perform any of the other operations for one or more of embodiments of a mobile gateway node disclosed herein.

Acronyms

LCD Liquid Crystal Display
TM Transport Medium
LED Light-Emitting Diode
OLED Organic Light-Emitting Diode
FOV Field-of-view
LiFi Light Fidelity
WiFi Wireless Fidelity
MGN Mobile Gateway Node
CC Content Coordinator
OTT Over The Top
FPS Frames Per Second Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A content distribution node for distributing content to display devices which are arranged in a spaced apart sequence along a pathway of vehicles for display to passengers of the vehicles, the content distribution node comprising:
   at least one Light Fidelity, Li-Fi, signal receiver circuit configured to receive Li-Fi signaling of messages from mobile gateway nodes transported by vehicles;
   at least one processor connected to the at least one Li-Fi signal receiver circuit; and
   at least one memory circuit storing program code that is executed by the at least one processor to perform operations comprising:
      receiving from a mobile gateway node of a vehicle through the Li-Fi signal receiver circuit, a profile message containing profile information related to the vehicle that is approaching the display devices;
      selecting, from among content files available in a content repository, a set of video frames of one of the content files for distribution to the display devices based on the profile information; and
      distributing different video frames among the set of video frames to different ones of the display devices with a timing of the distribution that allows the video frames among the set to be displayed on respective ones of the display devices in the sequence before arrival of the vehicle within a field-of-view of at least one of the display devices.

2. The content distribution node of claim 1, further comprising:
   determining speed of the vehicle based on the Li-Fi signaling received from the vehicle; and
   determining time-of-arrival of the vehicle to a field-of-view of at least one of the display devices based on timing of receipt of Li-Fi signaling from the mobile gateway node of the vehicle and the speed of the vehicle,
   wherein the distributing operation comprises controlling timing of the distribution of the video frames based on the time-of-arrival of the vehicle to the field-of-view of at least one of the display devices.

3. The content distribution node of claim 2, wherein:
   the at least one Li-Fi signal receiver circuit comprises two of the Li-Fi signal receiver circuits that are spaced apart along the pathway of the vehicle at defined distances from a first one of the display devices in the sequence, each of the Li-Fi signal receiver circuits is configured to receive Li-Fi signaling of messages from the mobile gateway node of the vehicle;
   the receiving operation comprises receiving two profile messages, each from a different one the Li-Fi signal receiver circuits; and
   the determining speed operation comprises determining the speed of the vehicle based on elapsed time between receipt of the two profile messages and distance between the Li-Fi signal receiver circuits.

4. The content distribution node of claim 1, wherein:
   the receiving operation further comprises extracting a passenger feature vector from the profile information that characterizes interests of passengers in the vehicle; and
   the selecting operation further comprises:
      comparing the passenger feature vector to metadata tags associated with the content files stored in the content repository; and
      selecting the set of video frames of the content file based on the comparison of the passenger feature vector to the metadata tags.

5. The content distribution node of claim 1, wherein:
   the receiving operation further comprises extracting a vehicle feature from the profile information that characterizes the vehicle; and
   the selecting operation further comprises:
      comparing the vehicle feature to metadata tags associated with the content files stored in the content repository; and
      selecting the set of video frames of the content file based on the comparison of the vehicle feature to the metadata tags.

6. The content distribution node of claim 5, the operations further comprising:
   determining speed of the vehicle based on the Li-Fi signaling received from the mobile gateway node of the vehicle;
   determining based on the vehicle feature, a length of at least one passenger compartment of the vehicle; and
   determining a time duration during which passengers in the passenger compartment will remain in the field-of-view of the at least one of the display devices, based on the speed of the vehicle and the length of the at least one passenger compartment,
   wherein the distributing operation comprises controlling a distribution time delay, which is determined based on the time duration, before a subsequent distribution is allowed of another set of video frames that is selected for distribution to the display devices for viewing by passengers in another vehicle.

7. The content distribution node of claim 5, the operations further comprising:
   determining speed of the vehicle based on the Li-Fi signaling received from the mobile gateway node of the vehicle;
   determining based on the vehicle feature, a length of at least one passenger compartment of the vehicle;
   determining based on the vehicle feature, a number of passenger compartments forming the vehicle; and
   repeating for each of the number of passenger compartments forming the vehicle:
      extracting a passenger feature vector from the profile information that characterizes interests of passengers in the passenger compartment;
      comparing the passenger feature vector to metadata tags associated with the content files stored in the content repository;
      selecting a set of video frames of a content file based on the comparison of the passenger feature vector to the metadata tags;
      determining a time duration during which passengers in the passenger compartment will remain in the field-of-view of the group of the display devices, based on the speed of the vehicle and the length of the at least one passenger compartment;
      distributing different video frames among the set of video frames to different ones of the display devices with a timing of the distribution that allows the video frames among the set to be displayed on respective ones of the display devices in the sequence before arrival of the passenger compartment within the field-of-view of a group of the display devices; and
      controlling a distribution time delay, which is determined based on the time duration, before a subsequent distribution is allowed of another set of video frames that is selected for distribution to the display devices for viewing by passengers in another one of the passenger compartments.

8. The content distribution node of claim 1, the operations further comprising:
   determining speed of the vehicle based on the Li-Fi signaling received from the mobile gateway node of the vehicle;
   extracting a vehicle feature from the profile information that characterizes the vehicle;
   determining based on the vehicle feature, a number of windows in a sequence along one side of a passenger compartment of the vehicle and window spacing;
   selecting content files for display to the windows of the vehicle based on the comparison of the vehicle feature to metadata tags associated with the content files stored in the content repository, wherein at least two different content files are selected for display to at least two different ones of the windows based on the comparison;
   repeating for each of the number of windows along the side of the passenger compartment:
      determining time-of-arrival of the window to a field-of-view of one of the display device based on timing of receipt of the Li-Fi signaling from the mobile gateway node of the vehicle, a sequence location of the window among the windows, and the window spacing;
      obtaining a set of video frames of the content file which has been selected for display to the window; and
      distributing different ones of the video frames among the set of video frames to different ones of the display devices with a timing of the distribution so individual ones of the video frames are sequentially displayed on the different ones the display devices with timing synchronized to the arrival of the window within the field-of-view of the respective ones of the display devices.

9. The content distribution node of claim 8, further comprising operations, within the repetition for each of the number of windows along the side of the passenger compartment, to:
   determine a window time duration during which the window will remain in the field-of-view of the respective ones of the display devices, based on the speed of the vehicle; and
   control a number of the video frames among the set that are distributed to each of the different ones of the display devices for display based on the speed of the vehicle.

10. The content distribution node of claim 1, wherein the distributing operation comprises:
    determining speed of the vehicle based on the Li-Fi signaling received from the mobile gateway node of the vehicle;
    controlling a number of the video frames among the set that are distributed for display on each of the display devices based on the speed of the vehicle.

11. A mobile gateway node transportable by a vehicle for controlling distribution of content to display devices which are arranged in a spaced apart sequence along a pathway of the vehicle for display to passengers of the vehicle, the mobile gateway node comprising:
    a Light Fidelity, Li-Fi, access point circuit configured to transmit Li-Fi signaling of messages to a content distribution node that is not transported by the vehicle;
    at least one processor connected to the Li-Fi access point circuit; and
    at least one memory circuit storing program code that is executed by the at least one processor to perform operations comprising:
       obtaining profile information related to the vehicle;
       generating a profile message containing the profile information; and
       transmitting the profile message through the Li-Fi access point circuit for receipt by the content distribution node to control distribution of content by the content distribution node to the display devices that are being approached by the vehicle.

12. The mobile gateway node of claim 11, the operation for generating the profile message containing the profile information, comprises:
    generating the profile message containing the profile information to indicate a length of a passenger compartment of the vehicle and a number of passenger compartments forming the vehicle.

13. The mobile gateway node of claim 11, the operation for generating the profile message containing the profile information, comprises:
    generating the profile message containing the profile information to indicate a number of windows in a sequence along one side of a passenger compartment of the vehicle and window spacing.

14. The mobile gateway node of claim 11, further comprising:
    at least one radio access network transceiver that is transportable by the vehicle and configured to communicate with mobile subscriber terminals that are also transported by the vehicle; and wherein the at least one processor is further connected to the at least one radio access network transceiver, wherein the operations further comprise:

communicating through the at least one radio access network transceiver with the mobile subscriber terminals that are also transported by the vehicle to obtain a list of terminal identifiers for the mobile subscriber terminals; and generating the profile information based on the list of terminal identifiers.

15. The mobile gateway node of claim 14, the operations further comprising:

transmitting the list of terminal identifiers for the mobile subscriber terminals through the at least one radio access network transceiver toward a subscriber database;

receiving at least a portion of the profile information through the at least one radio access network transceiver from the subscriber database, the at least a portion of the profile information characterizing interests of passengers who are associated with the list of terminal identifiers for the mobile subscriber terminals; and including the at least a portion of the profile information in the profile message transmitted through the Li-Fi access point circuit for receipt by the content distribution node.

16. The mobile gateway node of claim 11, the operations further comprising:

repetitively transmitting the profile message through the Li-Fi access point circuit for receipt by the content distribution node.

17. A method of operating a content distribution node for distributing content to display devices which are arranged in a spaced apart sequence along a pathway of vehicles for display to passengers of the vehicles, the method comprising:

receiving from a mobile gateway node of a vehicle, through a Light Fidelity, Li-Fi, signal receiver circuit of the content distribution node, a profile message containing profile information related to the vehicle that is approaching the display devices;

selecting, from among content files available in a content repository, a set of video frames of one of the content files for distribution to the display devices based on the profile information; and distributing different video frames among the set of video frames to different ones of the display devices with a timing of the distribution that allows the video frames among the set to be displayed on respective ones of the display devices in the sequence before arrival of the vehicle within a field-of-view of at least one of the display devices.

18. The method of claim 17, further comprising:

determining speed of the vehicle based on the Li-Fi signaling received from the vehicle; and determining time-of-arrival of the vehicle to a field-of-view of at least one of the display devices based on timing of receipt of Li-Fi signaling from the mobile gateway node of the vehicle and the speed of the vehicle, wherein the distributing comprises controlling timing of the distribution of the video frames based on the time-of-arrival of the vehicle to the field-of-view of at least one of the display devices.

19. A method of operating a mobile gateway node transportable by a vehicle for controlling distribution of content to display devices which are arranged in a spaced apart sequence along a pathway of the vehicle for display to passengers of the vehicle, the method comprising:

obtaining profile information related to the vehicle;

generating a profile message containing the profile information; and transmitting the profile message, as Li-Fi signaling through a Light Fidelity, Li-Fi, access point circuit of the mobile gateway node, for receipt by a content distribution node to control distribution of content by the content distribution node to the display devices that are being approached by the vehicle.

20. The method of claim 19, further comprising:

transmitting a list of terminal identifiers for mobile subscriber terminals transported by the vehicle as part of the profile message.

\* \* \* \* \*